United States Patent Office 3,399,307
Patented Aug. 27, 1968

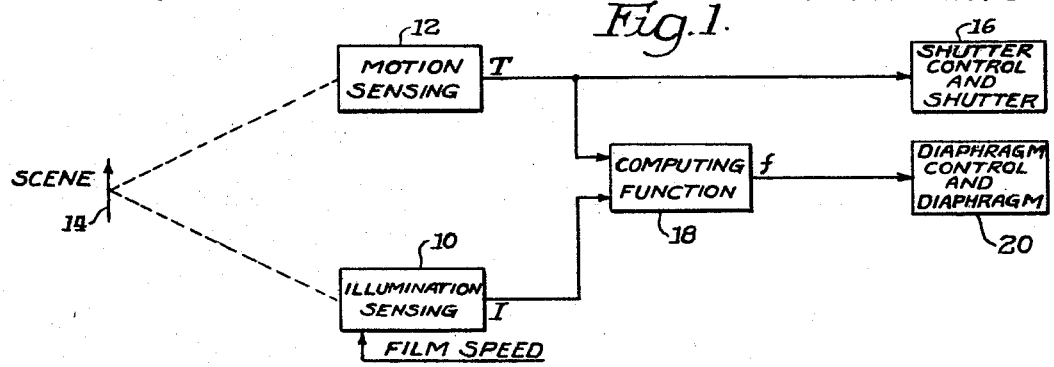
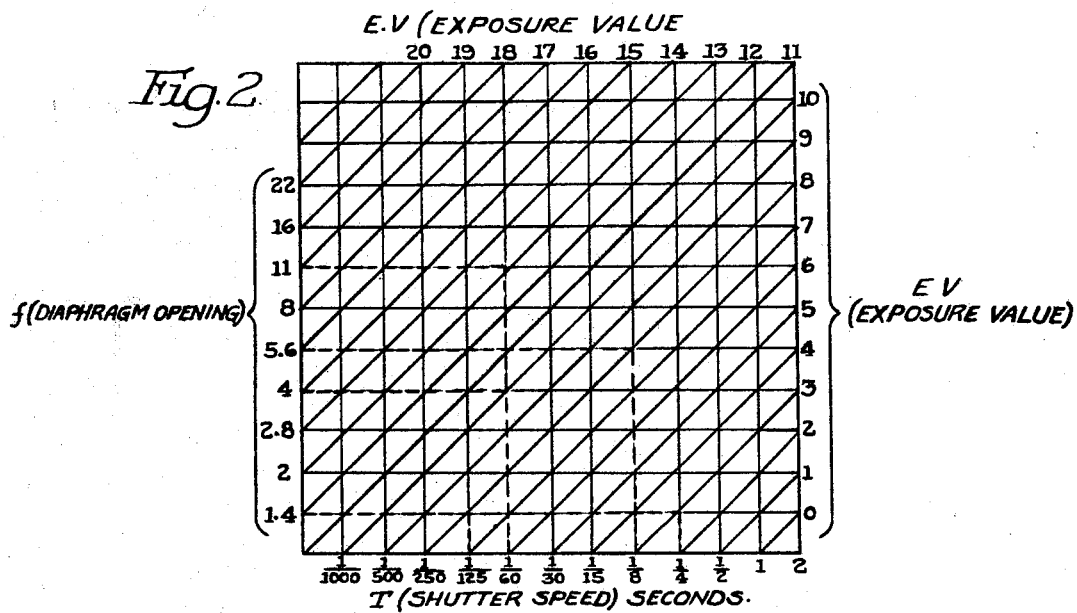
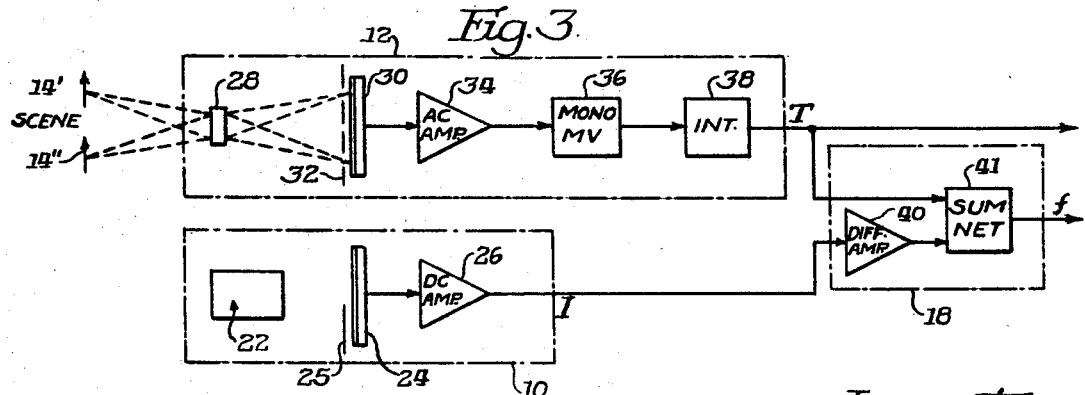

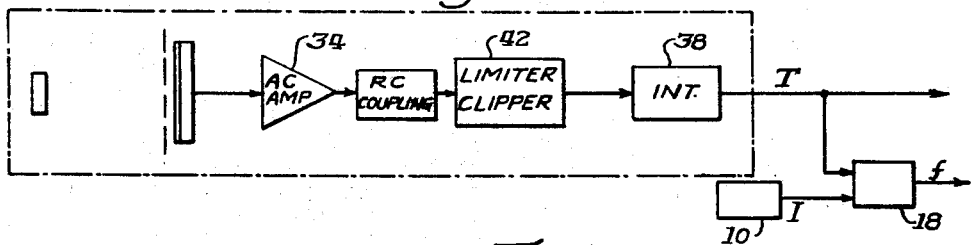
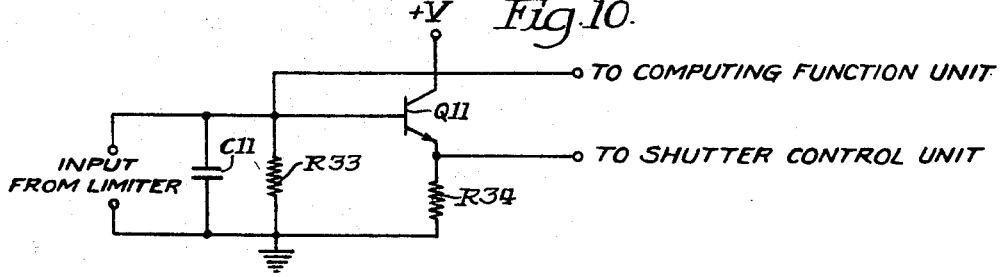
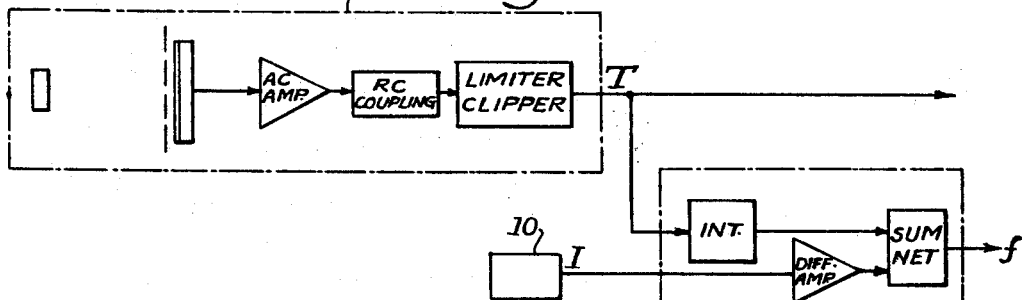

3,399,307
MOTION SENSING EXPOSURE SYSTEM FOR OPTICAL INSTRUMENTS
Herman Levin, Glenview, Ill., assignor to Bell & Howell Company, Chicago, Ill., a corporation of Illinois
Filed May 20, 1965, Ser. No. 457,440
25 Claims. (Cl. 250—224)

This invention relates to new and improved automatic exposure control for cameras and other optical instruments, and particularly one wherein the relative motion between the camera and object is taken into consideration in determining both shutter speed and diaphragm opening.

In automatic exposure cameras of the prior art, the required film exposure is determined both by film speed and by the reflected or transmitted light from the scene. For any particular scene illumination there are a number of combinations of diaphragm openings and shutter speeds that will properly expose film of a given speed. In fully automatic exposure cameras, the combination is factory chosen so that the automatic circuits cannot take into account the nature of the scene. For instance, if one were photographing an action scene, he would desire a faster practical shutter speed. On the other hand, if the desire is for scenery and the maximum depth of field, then one would desire a smaller aperture. In both cases the amount of required film exposure may be exactly the same. It would be desirable, therefore, to be able to have an automatic determination of either exposure time (shutter speed) or aperture (diaphragm opening) as a function of the particular scene. Of the two, the most appropriate is the exposure time since it is generally desired to record the image without blurring or degradation due to object and/or camera relative motion. Therefore, what is required in an exposure system is means for sensing relative object motion. If such object motion can be determined, then the automatic camera would not only expose the film correctly but expose it with due regard to, rather than ignoring, the scene that is being photographically recorded.

Therefore, one object of the present invention is to provide a fully automatic exposure control circuit for determining both shutter speed and diaphragm opening in accordance with the nature of the scene being photographed.

Another object of the present invention is to provide a fully automatic exposure control circuit for a camera or the like which includes means for sensing relative object motion to determine the necessary shutter speed in order to prevent image blurring.

A further object of the present invention is to provide automatic means in an exposure control system for first determining the required shutter speed from relative object motion, and using said shutter speed determination to calculate a diaphragm opening from the film exposure value.

These and other objects of the present invention will become apparent during the course of the following description to be read in view of the drawings, in which:

FIG. 1 is a block diagram showing the general organization of the novel system;

FIG. 2 is a chart showing the relationship of typical shutter speeds and diaphragm openings with respect to different exposure values;

FIG. 3 shows the logical organization of one species of the present invention;

FIG. 4 shows various types of gratings which may be used in the motion sensing unit of the invention;

Figure 5:
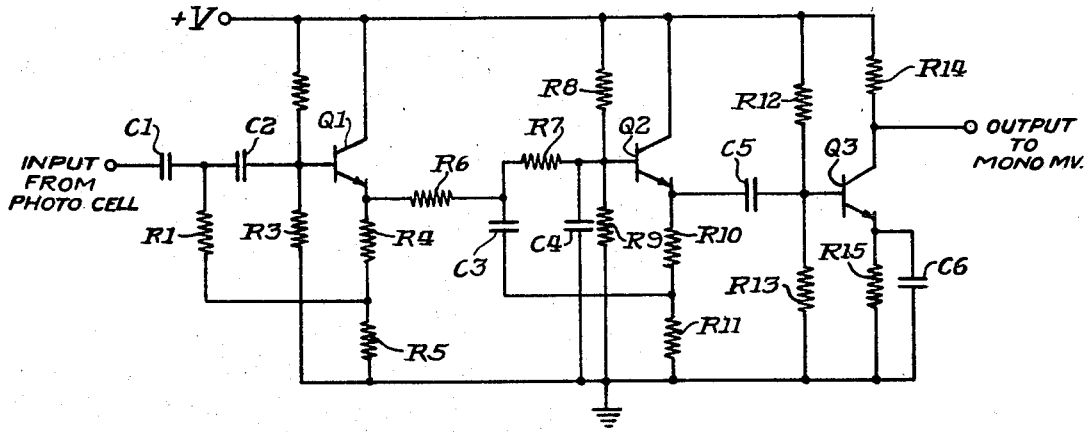

FIGS. 5, 6, 7, and 8 show circuit details of certain units in FIG. 3;

FIG. 9 shows the logical organization of a different embodiment of the present invention;

FIG. 10 shows a simple integrator circuit useful in the system of FIG. 9; and

FIG. 11 shows the logical organization of still another embodiment of the present invention.

The general system organization is shown in FIG. 1 as comprising an illumination sensing unit 10, and a motion sensing unit 12 both sensitive to light received from an object or scene 14 to be photographed or otherwise optically analyzed. The illumination sensing unit 10 generates an electrical output I indicative of the amount of light being received from object 14 or the scene in which it appears, and thus has a function identical with that in many prior art automatic exposure cameras. Signal I can vary in at least one of its parameters, e.g. amplitude, with the scene illumination. Unit 10 also normally takes into consideration the speed of the film being used when generating the I output, but the film speed independent variable could alternatively be entered into a computing unit 18 subsequently described. Motion sensing unit 12, on the other hand, gives an electrical output T which is a function of the relative transverse motion rate between object 14 and unit 12. Signal T varies in at least one of its parameters, e.g. amplitude, with the transverse relative velocity between the object and the optical system. Thus, the output T is used to determine the shutter speed necessary in order to prevent image blurring due to motion of object 14 and/or the system. Any well known shutter control and shutter unit 16 receives signal T from motion sensing unit 12 in order to so cause the shutter speed to occur. In order to determine the particular diaphragm opening necessary to admit enough light to correctly expose the film for the shutter speed being used, the computing function unit 18 receives both signal T from motion sensing unit 12 and the illumination signal I from unit 10 in order to generate a signal $f$ indicative of the diaphragm opening (or $f$ stop) and which varies in at least one of its parameters, e.g. amplitude, with variation in either a signal T or I when the other stays constant. Thus, signal $f$ from unit 18 is a function of both the determined shutter speed and the illumination emanating from object 14. This $f$ signal is directed to a diaphragm control and a diaphragm unit 20 for adjusting the aperture to the required value.

The philosophy of operation of the present invention as illustrated in FIG. 1 may be better understood by reference to FIG. 2. This is a chart for ascertaining at a glance the required combination of shutter speed and diaphragm opening necessary to sufficiently expose the film in accordance with the film speed and intensity of the received light from the scene. The shutter speed values are indicated at the lower horizontal co-ordinate of the graph, while diaphragm opening is specified along the left vertical coordinate. Various diagonal lines respectively indicate different exposure values which in turn are indicated along the top and right of the graph. Exposure values are a simple way of expressing the amount of exposure required and are functions of the film speed and scene illumination. For any given exposure value, a certain amount of light must enter the camera or optical instrument in order to provide a satisfactory image without over or under exposure. This necessary amount of light is provided by adjusting both the shutter speed and aperture in order to vary the length of time that the diaphragm opening is able to transmit light therethrough. Consequently, the total amount of light which impinges upon the photographic film is a function of the duration and amplitude of the light which passes through the diaphragm.

Referring now to both FIG. 2 and FIG. 1, assume that for a film in the camera of a given speed, illumination sensing unit 10 of FIG. 1 determines that an exposure value of 8 is required in order to provide an image neither over nor under exposed. Sensing unit 10 may either generate a signal I only representative of the illumination reading, thereby leaving it to computing function unit 18 to consider film speed in determining the exposure value (which is a function of both light intensity received and film speed), or alternatively, sensing unit 10 may incorporate means settable according to the particular film speed in order to generate an output signal I which is itself indicative of the exposure value. In either case, it is necessary for motion sensing unit 12 to determine the transverse velocity, or rate of relative transverse movement, between it (i.e. the camera) and object 14. Said relative transverse motion may be brought about either because of a stationary camera and moving object, a stationary object and moving camera, or both a moving object and moving camera. Thus, motion sensing unit 12 generates a signal T representative of this relative motion rate which signal then can be used by unit 16 to cause the slowest shutter speed which can catch the image without blurring of same. Assume, for the sake of this example, that said signal T represents a shutter speed of 1/8 second. The shutter control unit 16 therefore will cause the shutter to open for this period of time. Furthermore, this signal T is employed by computing function unit 18 to determine what diaphragm opening must be used in order to admit light to the film in accordance with the exposure value requirement. In FIG. 2, the chart is used by vertically extending a line from the determined shutter speed to its intersection with the required exposure value diagonal, from which point a horizontal line is taken to the left in order to calculate the required aperture. For an exposure value of 8 and shutter speed of 1/8 sec., it is therefore seen that a diaphragm of $f$ opening of $f/5.6$ is required in order that the film will be correctly exposed. Consequently, the $f$ signal from computing function unit 18 represents such a diaphragm opening which is used by the diaphragm control unit 20 for so adjusting the aperture. On the other hand, a shutter speed of 1/125 sec. requires an aperture of $f/1.4$ for the same exposure value of 8.

Other examples of assumed exposure values and shutter speeds are also shown in FIG. 2. For example, assume that illumination sensing unit 10 determines the exposure value at a given film speed to be equal to 10, while motion sensing unit 12 determines that a shutter speed of at least 1/60 sec. is required in order to prevent image blur. From FIG. 2 the horizontal taken from the intersection of the exposure value diagonal 10 with the 1/60 vertical shows that a diaphragm opening of $f/4$ is necessary. On the other hand, assume in another situation that the relative motion rate between unit 12 and object 14 is the same but that much more light is being reflected from the scene than in the previous case. The required exposure value in such a situation would therefore be higher than 10 and is now assumed to be 13. Consequently, although the same T value of 1/60 is indicated to be necessary by motion sensing unit 12, a smaller aperture of $f/11$ is required to avoid overexposure of the film.

Although many different types of circuits can be designed for performing the functions broadly specified by units 10, 12, and 18 in FIG. 1, several different preferred embodiments are here disclosed. In FIG. 3, illumination sensing unit 10 is seen to be comprised of a system 22 for collecting light emanating from the scene or object 14 and for impinging same upon a photocell or photoresistor 24 in a typical prior art manner. This system 22 may have a tube or baffle (not shown) to limit the field of view. A movable baffle 25 can be provided for different film speeds, which is adjustable so as to permit a greater surface area on photocell 24 to be exposed the greater the film speed. Other film speed setting means can be alternatively employed. Photocell 24 converts light into an electrical signal which may be amplified by D.C. amplifier 26 whose output level or amplitude therefor varies with the scene illumination and is also indicative of the exposure value necessary for the given film speed.

Motion sensing unit 12 of FIG. 3 is generally comprised of a system 28 for also receiving light from the scene or object 14. For certain environments it may be desirable to have a rather confined or narrow field of view for system 28 such that it collects light coming only from about the center of the scene in order to make the motion sensing dependent upon only one moving object therein. Situated behind lens 28 is a photocell or photoresistor 30 which generates or causes to be generated an electrical signal varying in response to the light striking its surface. However, between lens 28 and photo responsive element 30 is a light chopping element 32, such as a screen or grating comprised of alternate transparent and opaque areas, for presenting a chopped light input to photo device 30 due to the transverse motion of object 14 relative to unit 12. When object 14 is in, for example, a position 14', then a light ray from the center thereof is focused by system 28 through a particular transparent area of grating 32 to strike the surface of photo device 30. When object 14 is at position 14", light from the same said object center is focused through a different transparent area of grating 32. In moving between position 14' and 14", light from this center point on the object sweeps across the face of grating 32 and thus is interrupted by the opaque areas thereon. Consequently, an A.C. output is generated by photo device 30 only when there is relative transverse motion between the camera and the object, with the frequency of the A.C. output being proportional to the velocity, or rate of said relative transverse movement. Grating 32 may take any one of several forms such as are shown in FIG. 4. It may comprise, for example, a pattern of parallel bars of alternate transparent and opaque areas such as shown in FIG. 4A, or of interrupted parallel bars as shown in FIG. 4B. On the other hand, concentric circular bands may be employed as in FIG. 4C or diagonal lines as in FIG. 4D. The advantage of the concentric circle pattern of FIG. 4C is that it produces an output from photo device 30 regardless of direction of object motion. Other possible grid or grating patterns, among many, include spirals. Furthermore, it should be appreciated that element 32 could alternately comprise a surface having alternately disposed areas of different reflecting characteristics, rather than different transparency characteristics, in order to transmit chopped light to the photocell.

The alternating output of device 30 is amplified by an A.C. amplifier 34 which may also include a band pass filter for rejecting certain unwanted A.C. frequencies not caused by relative transverse motion. This amplified A.C. signal is then used to trigger a circuit 36 that provides a constant amplitude, constant width pulse for each input alternation, as for example a one-shot or monostable multivibrator. The frequency of the square wave output from circuit 36 is therefore indicative of the relative transverse motion rate, and this output may be time integrated by a circuit 38 in order to provide a D.C. level also indicative of relative motion rate. Thus, integrator 38 sums these pulses on a time basis to provide a direct current analog signal T of the relative object velocity which serves to represent or determine the necessary shutter speed. When combined with the analog exposure value level from D.C. amplifier 26, the signal T helps to determine the proper aperture setting. Thus, in the species of FIG. 3 the computing function unit 18 may include a summing network 41 for adding together the shutter speed D.C. signal T and the exposure value D.C. signal I (applied thereto via a reference differential amplifier circuit 40) to obtain a D.C. signal $f$ indicative of the necessary diaphragm opening.

FIG. 5 shows particular details of a suitable band pass filter-amplifier circuit 34 which may be used in FIG. 3. The alternating output of photocell 30 (FIG. 3) is applied to the base electrode of an NPN transistor Q1 connected as an emitter follower. A band pass filter, which includes capacitors C1–C4 and transistors Q1 and Q2, eliminates both the photocell direct current level and the gross change of that level with a change of scene or position of the object, as well as eliminating the light level ripple inherent in any A.C. operated artificial illumination source which may be playing upon the scene. Amplifying stage Q3 raises the peak levels of the filtered alternating input thereto to a particular minimum level sufficient to trigger the next following one shot multivibrator 36 (FIG. 3). Details of FIG. 5 are conventional and thus will not be elaborated upon.

Figure 6:
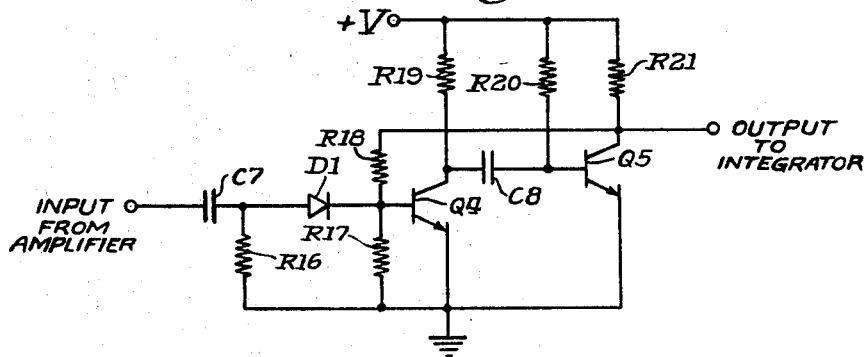

FIG. 6 shows a suitable but conventional one shot or monostable multivibrator for use as unit 36 in FIG. 3. The alternating output from amplifier 34 is transferred via coupling capacitor C7 and diode D1 to the base of NPN transistor Q4 so that positive excursions of the input signal cause transistor Q4 to begin conduction. The consequent negative output from transistor Q4 therefore turns off NPN transistor Q5 which in turn makes high its output so as to maintain transistor Q4 in conduction for a period of time (always less than the maximum anticipated frequency) determined by the capacitor-resistor network of C8 and R20. Thus, positive A.C. peak inputs to FIG. 6 cause square wave output pulses from transistor Q5 which are uniform in both width and amplitude. The motion sensing system of FIG. 3 is therefore sensitive only to the repetition rate or frequency of the A.C. output from photocell 30, but not to its wave form shape or to any undesired A.C. frequencies contained in the signal to amplifier 34.

Figure 7:
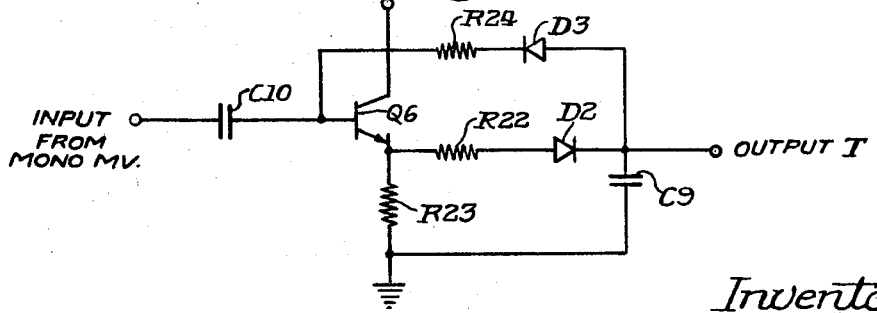

FIG. 7 shows a transistor time rate integrator circuit for use as unit 38 in FIG. 3. A capacitor C9 is charged by a same incremental amount for each positive square wave pulse received from the monostable multivibrator. Each leading edge of said positive input pulse is applied via C10 to turn on the NPN transistor Q6 so as to supply capacitor C9 with a positive current via resistor R22 and diode D2. The purpose of the loop comprised of diode D3 and resistor R24 is to maintain a proper bias level on Q6 so that the integrated output will be a linear function of input pulse frequency, i.e., the higher the frequency the greater the D.C. output level from FIG. 7. Thus, the output of FIG. 7 is also an analog signal of the rate of relative transverse object motion.

FIG. 8 shows means for use as circuits 40 and 41 in FIG. 3. The differential amplifier is comprised of transistors Q7 and Q8, with the D.C. output I from amplifier 26 (FIG. 3) in illumination sensor 10 being applied to the base electrode of transistor Q7. A Zener breakdown diode ZD is connected between the base electrode of transistor Q8 and a potential source −V in order to provide a convenient circuit reference voltage for one side of the differential amplifier. The output signal from transistor Q7 (representing the difference between the Q7 and Q8 input signals) is applied via a summing resistor R29 to a junction point J connected to the emitter electrode of NPN transistor Q9. In like fashion, the D.C. analog output T from integrator 38 of FIG. 3 is applied via a summing resistor R30 to said junction J, such that the input emitter signal to transistor Q9 is generally the sum of the analog signals appearing from motion sensor 12 and illumination sensor 10 (as modified by the differential amplifier). This causes transistor Q9 to generate an output signal at its collector electrode which, when inverted and amplified by a transistor Q10, produces a D.C. signal $f$ representing the required diaphragm opening and which varies with change in either signal T or signal I when the other remains constant. Of course, signal $f$ can also vary with change in both signals T and I when the change in one does not cancel the effect of a change in the other.

As stated previously, FIG. 3 is only one preferred way in which the functions of motion sensor 12, illumination sensor 10, and computing unit 18 may be implemented. Another and somewhat simpler embodiment is that shown in block form in FIG. 9, whose illumination sensor 10 and computing unit 18 are identical to those shown in FIG. 3, but whose motion sensing unit 12 differs slightly in that the output of the A.C. amplifier 34 is merely clipped or limited by unit 42 (well known) in order to produce pulses appropriate to be integrated by unit 38. Integrator 38 in FIG. 9 may be of the same construction as in FIG. 7, but alternatively can be less complex as shown by the circuit of FIG. 10. In FIG. 10, the pulses from limiter-clipper circuit 42 in FIG. 9 are applied to the input terminals where they are used to charge capacitor C11 (which is discharged via R33 between pulses) to an analog D.C. value indicative of the pulse frequency, i.e. relative motion rate of the object. This level on capacitor C11 is amplified by emitter follower transistor Q11 whose output is then taken to the shutter control and shutter unit 16 of the system. The analog output from C11 may be directly taken, without amplification, to summing resistor R30 of FIG. 8 for use in determining the diaphragm opening.

The embodiment of FIG. 9 may in turn be slightly varied in the manner shown by FIG. 11. Here motion sensing unit 12 does not include an integrating circuit which instead is now made part of the computing unit. The pulses from unit 12 are sent directly to the integrator in unit 18 and also the shutter control and shutter unit 16 which is now of the kind to respond to pulse frequency rather than to a D.C. level. For this embodiment, then, the signal T varies in its parameter of pulse frequency rather than in its D.C. amplitude as is the case in FIG. 3.

While several preferred embodiments of the invention have been shown and/or described, various modifications of same and/or other species may be obvious to those skilled in the art without departing from the novel principles defined in the appended claims.

The embodiments of the invention in which an exclusive property or privilege is claimed are defined as follows:

1. In an automatic light exposure system, the combination comprising:
 (a) first means responsive to light from a scene for generating a first electrical signal indication which varies in at least one of its parameters with the rate of relative transverse movement between said first means and an object in the scene;
 (b) second means responsive to light from the scene for generating a second electrical signal indication which varies in at least one of its parameters with the intensity of the scene illumination; and
 (c) third means receiving said first and second electrical signal indications for generating a third electrical signal indication which varies in at least one of its parameters with variation in one of said first and said second electrical signal indications when the other remains constant.

2. The invention according to claim 1 wherein said first means generates a said first electrical signal indication which is a D.C. signal variable at least in amplitude.

3. The invention according to claim 2 wherein said third means generates a said third electrical signal indication which is a D.C. signal variable at least in amplitude.

4. The invention according to claim 1 wherein said first means generates a said first electrical signal indication which is a pulse train variable at least in frequency.

5. The invention according to claim 4 wherein said third means generates a said third electrical signal indication which is a D.C. signal variable at least in amplitude.

6. The invention according to claim 1 wherein said first means generates a said first electrical signal indication which is variable at least in amplitude, said second means generates a said second electrical signal indication which is variable at least in amplitude, and said third means combines said first and said second electrical signal indication amplitudes to generate a said third electrical signal indication which is variable at least in amplitude.

7. The invention according to claim 6 wherein said third means includes electrical amplitude summing means.

8. The invention according to claim 1 wherein said first means includes both photoresponsive means, and first optical means located to receive light from the scene and to transmit said light to impinge upon said photoresponsive means such that said relative transverse movement causes a cyclic variation in the light upon said photoresponsive means.

9. The invention according to claim 8 wherein said first means further includes electrical means connected in circuit with said photoresponsive means to generate electrical pulses whose frequency varies with the frequency of the light cyclic variation on said photoresponsive means.

10. The invention according to claim 9 wherein said first means further includes means responsive to said electrical pulses for generating a said first electrical signal indication which is a D.C. signal variable in amplitude with the pulse frequency.

11. The invention according to claim 9 wherein said electrical pulses are said first electrical signal indication, and said third means includes means responsive to said electrical pulses for generating a D.C. signal variable in amplitude with the pulse frequency.

12. The invention according to claim 8 wherein said first means further includes second optical means of a relatively narrow field of view which is located between said first optical means and the scene.

13. The invention according to claim 8 wherein said first optical means is an optical grating.

14. The invention according to claim 8 wherein said first optical means has alternately disposed areas of different light transmitting characteristics.

15. The invention according to claim 14 wherein said alternately disposed areas of said first optical means are arranged as parallel bars.

16. The invention according to claim 14 wherein said alternately disposed areas of said first optical means are arranged as concentric circles.

17. In an automatic light exposure system, the combination comprising:
  (a) motion sensing means including photoresponsive means, first optical means having alternately disposed areas of different light transmitting characteristics which is located to receive light from a scene and to transmit said light to impinge upon said photoresponsive means such that relative transverse movement between said first optical means and an object in the scene causes a cyclic variation in the light upon said photoresponsive means, A.C. amplifier means connected to said photoresponsive means for producing an A.C. signal whose frequency varies with the frequency of said light cyclic variation, pulse forming means responsive to said A.C. signal for generating a train of substantially equal width-equal amplitude electrical pulses whose frequency varies with the frequency of said A.C. signal, and time integrating means responsive to said electrical pulses for generating a first D.C. signal which varies in amplitude with their frequency;
  (b) illumination sensing means responsive to light from the scene for generating a second D.C. signal which varies in amplitude with the intensity of the scene illumination;
  (c) and computing means combining said first and second D.C. signals for generating a third D.C. signal which is variable in amplitude.

18. The invention according to claim 17 wherein said pulse forming means comprises a monostable multivibrator circuit.

19. The invention according to claim 17 wherein said pulse forming means comprises a limiter circuit.

20. The invention according to claim 17 wherein said A.C. amplifier means includes a band pass filter for preventing frequencies in said A.C. signal which are caused by other than said relative transverse movement.

21. In an automatic light exposure system, the combination comprising:
  (a) first photoresponsive means;
  (b) first optical means having alternately disposed areas of different light transmitting characteristics which is located to receive light from a scene and to transmit said light to impinge upon said first photoresponsive means such that relative transverse movement between said first optical means and an object in the scene causes a cyclic variation in the light upon said first photoresponsive means;
  (c) first electrical means in circuit with said first photoresponsive means to generate electrical pulses whose frequency varies with the frequency of the light cyclic variation on said first photoresponsive means;
  (d) time integrating means responsive to said electrical pulses for generating a first D.C. signal variable in amplitude with the pulse frequency;
  (e) second photoresponsive means receiving light from the scene;
  (f) second electrical means in circuit with said second photoresponsive means to generate a second D.C. signal variable in amplitude with the intensity of the light on said second photoresponsive means; and
  (g) summing means for combining said first and said second D.C. signals to generate a third D.C. signal variable in amplitude.

22. The invention according to claim 21 wherein is further included second optical means of a relatively narrow field of view which is located between said first optical means and the scene.

23. The invention according to claim 21 wherein said alternately disposed areas of said first optical means are arranged as parallel bars.

24. The invention according to claim 21 wherein said alternately disposed areas of said first optical means are arranged as concentric circles.

25. An automatic film exposure system for a camera wherein the improvement comprises the combination of:
  (a) first means detecting the rate of relative transverse movement between the first means and an object in a scene being photographed for generating a first indication representative of a shutter speed necessary to prevent image blurring;
  (b) second means responsive to the intensity of the scene illumination for generating a second indication representative of the required film exposure value; and
  (c) third means responsive to said first and said second indications for generating a third indication representative of the diaphragm opening necessary to correctly expose the film.

References Cited

UNITED STATES PATENTS

| | | | |
|---|---|---|---|
| 3,173,019 | 3/1965 | Wormser | 250—203 X |
| 3,179,805 | 4/1965 | Astheimer | 250—210 X |
| 3,230,847 | 1/1966 | Gregory et al. | 352—141 X |

WALTER STOLWEIN, *Primary Examiner.*